Aug. 4, 1942.  J. W. CAVES  2,291,690
GEAR SHIFT
Filed Feb. 6, 1940
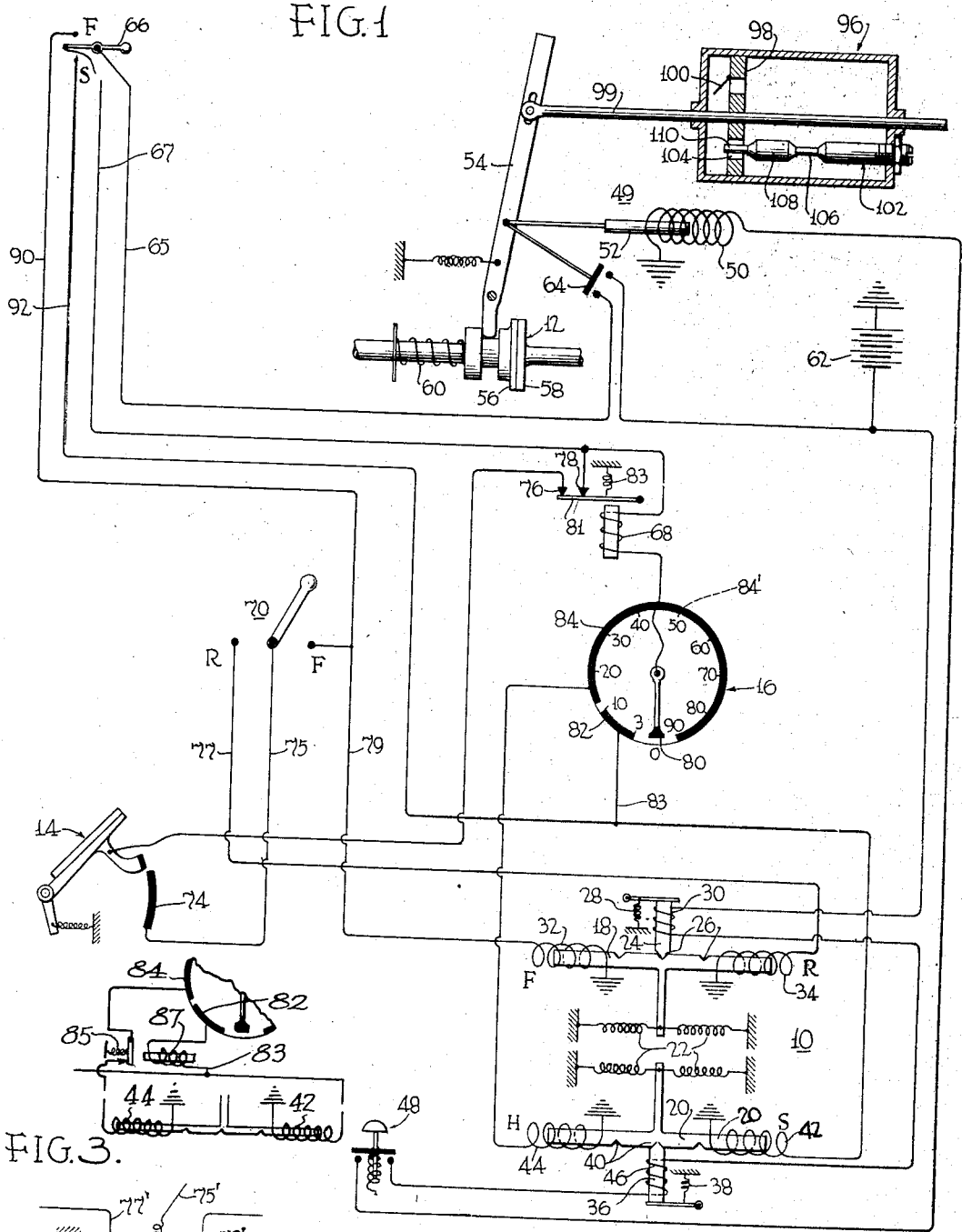
FIG.1
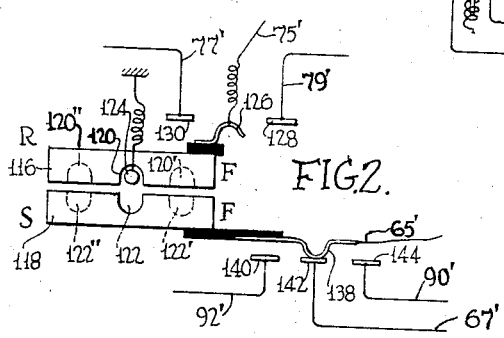
FIG.3.
FIG.2.
INVENTOR
James Walter Caves
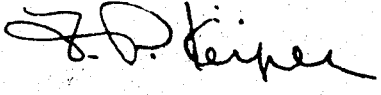
ATTORNEY Patented Aug. 4, 1942

2,291,690

UNITED STATES PATENT OFFICE 2,291,690

GEAR SHIFT

James Walter Caves, Phelps, N. Y.

Application February 6, 1940, Serial No. 317,498

20 Claims. (Cl. 192—.01)

The present invention relates to gear shifting devices, and more particularly to the semi-automatic and improved manual operation of automotive vehicle gear shifts.

In automotive vehicle gear shifts, and the control of the vehicle generally, there has usually been provided, a foot operated clutch between the gear shift and the motor, a manually selectable gear shift lever, and a foot throttle for the motor. The operator with these controls has been forced to use his judgment in the operation of these various controls to the end that smooth transmission of power from the engine to the drive wheels of the vehicle can be effected under the widely differing requirements.

Much of this heretofore manual operation can be done away with together with the consequent necessity for the operator's exercise of judgment, and the present invention is directed to a gear shifting device of such a nature as to do away with the usual manual gear shift lever, and at the same time make the gear shifting operation thereof automatic and yet dependent upon certain natural operations of the operator for initiating such automatic operation, which manual operations have in the past become habitual to a large number of motor vehicle operators. For example, the clutch pedal has in standard vehicles always been depressed to disengage the clutch to change gears, and for starting, at least some accelerator operation to open the engine throttle has been resorted to. The present invention is designed to eliminate all other movements, and in the preferred form to simplify the clutch operation by supplanting the usual pedal by a simple control button. The usual gear shift lever, as well as the necessity for the operator to exercise judgment in the selection of a particular gear ratio is eliminated for all usual driving.

It is, therefore, an object of the invention to provide an improved automatic gear shifting device in which the several gear ratios are automatically selected at will but in accordance with vehicle speed and in which the habitual movements of the operator's foot control movements are employed for control.

A further object of the invention is to provide an automatic gear shift in which control over selection of starting gear ratios is restricted to operation of the motor speed control or accelerator, and the other ratios are selected independent thereof automatically in accordance with vehicle speed.

Another object of the invention is to provide in such a gear shift control an arrangement wherein the operation of the clutch is automatic and in which the selection of any gear ratio is dependent upon the operation thereof.

Still another object of the invention is to provide a relatively simple gear shift control arrangement adapted to electrical control and relatively free of electrical contacts liable to be a source of trouble in such apparatus, and also a circuit which is dead except during gear shifting operations.

The above and other novel features of the invention will appear more fully hereinafter from the following detailed description when taken in conjunction with the accompanying drawing. It is expressly understood, however, that the drawing is for purpose of illustration only and not designed as a definition of the invention, reference being had for this purpose to the appended claims.

In the drawing, wherein like reference characters indicate like parts:

Figure 1 is a diagrammatic circuit illustrating a preferred form of the invention and Figure 2 is a diagrammatic fragmental portion of a circuit adapted to be applied to that of Figure 1.

Figure 3 is a diagram of a circuit illustrating a slight modification of Figure 1.

Referring to the drawing and more particularly to Figure 1 thereof, there is illustrated diagrammatically a transmission 10, having the customary three selective speeds forward and reverse, a clutch 12 adapted to be positioned between the engine and the transmission, an accelerator pedal 14, or throttle control, and a vehicle speed responsive device 16.

The transmission is provided with a low gear ratio and reverse shift rail 18, an intermediate and high gear ratio shift rail 20, both of which may be spring centered by centering springs 22, so as to travel to the neutral position when otherwise released. Each shift rail is provided with motor means to move the same to either gear position, as well as a shift rail lock adapted to retain the shift rail in any shifted position. More specifically shift rail 18 is provided with a lock pin 24 adapted to engage any one of the notches 26 under pressure of the spring 28, and to be withdrawn from the notches by the solenoid 30. The shift rail is adapted to be moved to the low gear ratio position through a solenoid 32, or to reverse gear position as by a solenoid 34.

The gear shift rail 20 is similarly provided with a lock pin 36, spring pressed as at 38 into notches 40. Similarly the rail is adapted to be moved to the intermediate gear ratio position by a solenoid 42 and to the high gear ratio by a solenoid 44, and the shift lock is adapted to be released by the solenoid 46.

Through the use of a foot switch 48, which may be located for operation by the left foot and in the usual and customary position of the clutch pedal, operation of the clutch can be effected by the power clutch release or disengaging motor 49 constituted by a solenoid 50 acting upon the armature 52 to move the clutch operating lever 54 to disengage the clutch plates 56 and 58, otherwise urged into engagement by the spring 60. The circuit involved will be seen to involve the foot switch 48, the transmission lock release solenoids 46 and 30, the clutch releasing or disengaging motor solenoid 50 and a battery 62, all being arranged in a series circuit.

To effect suitable selection of proper gear ratios automatically, and only at such times as the clutch is disengaged, a switch 64 is provided which is closed upon disengagement of the clutch to control the flow of energy from the battery 62 to the gear shift selecting solenoids, and control circuits therefor.

For example, when the vehicle is at rest, either low gear or reverse should be selected. If reverse gear is desired, manual switch 70 is closed upon the side indicated by R. Then upon the closing of clutch operated switch 64 (the result of depressing foot switch 48), and upon the slight opening of the throttle to close an accelerator operated switch 74, a circuit is completed from the battery 62, through contacts 64, lead 65, through switch 66, normally in the position shown, lead 67, closed relay contacts 78 and 76, normally held closed by contact bar 81 and spring 83 (relay winding 68 being deenergized), thence to throttle switch 74, lead 75 to manual switch 70, and lead 77 to reverse solenoid 34. Thus reverse gear is selected. If low gear is to be selected, then the switch 70 is thrown to the position marked F and through lead 79, low gear solenoid 32 is energized to selected first gear.

To cause the vehicle to get under way, the foot switch 48 is then released, opening the circuit to the clutch operating solenoid 50, and the gear shift locks 24 and 36 so that upon subsequent opening of clutch operated switch 64, and deenergization of the shifting sclenoids 34 or 32, the shift rail is held in the selected position.

Intermediate gear can be selected at any time sufficient vehicle speed is attained so that the speedometer wiper contact 80 engages the intermediate gear segment 82. Upon this event, upon the disengagement of the clutch, in the manner heretofore explained, a circuit is completed through the relay winding 68 and intermediate gear solenoid 42, the relay contacts 76 and 78 being opened as a result of the energization of the relay winding 68. It will be understood that upon such energization of the clutch operating solenoid 50, simultaneously the shift rail locks 24 and 36 are actuated to release the gear shift rail for selection of a new gear ratio, the former gear selection being neutralized by the action of the neutralizing springs 22.

After intermediate gear has been thus selected and reengaging the clutch by release of the foot switch 48, the vehicle speed may be increased until the speedometer wiper contact 80 engages the high gear segment 84, at which time, by disengagement of the clutch, through actuation of foot switch 48, high gear is automatically selected as soon as the disengaging movement of the clutch closes switch 64. Simultaneously with the disengagement of the clutch, the shift locks 24 and 36 are withdrawn, and the previous gear selected is thus permitted to disengage and neutralize, preparatory to the closing of contacts 64 by the clutch, to effect a new gear ratio. Such a system is readily adaptable to overdrive gear ratio transmissions by dividing segment 84 to create a segment 84' connected to a solenoid to engage an overdrive gear ratio, for example, in excess of 50 M. P. H. upon actuation of clutch operating foot switch 48.

Should it be desirable to provide for manual selection of intermediate gear or low gear, aside from the automatic speed control thereof, the switch 66 can be provided with provision for cutting out the circuit through lead 67 to the relay 68 and substituting therefor direct circuits 90 and 92 to the low gear solenoid 32 or the intermediate gear solenoid 42, so that either may be selected at will, should conditions be such as to warrent manual operation. For example, such provision makes it possible to select intermediate or low gear ratio as a power brake without reducing the vehicle speed to that corresponding segment of the speed responsive device 16.

Operation of the clutch in disengagement is substantially instantaneous, and entirely automatic in response to the operation of the foot switch 48, the usual pedal extremity being removed from the clutch pedal and the switch 48 being substituted therefore in substantially the same relative position. Reengagement of the clutch is controlled through a dash pot 96 in which there is located a piston 98 moved by the clutch in its disengaging and engaging movement by the piston rod 99. The dash pot may be filled with liquid or air or any suitable control medium. With the disengagement of the clutch, the piston 98 moves to the right, and because of the check valve 100, in the piston face, its movement is substantially unimpeded. Return movement, however, closes the check valve 100, and is dependent upon the returning action of the metering pin 102 in its cooperation with the orifice 104. In order to provide for relatively rapid movement prior to the clutch plates contacting, the pin has a reduced portion 106. To slow the clutch movement down at the point of plate engagement to prevent grabbing, the pin is provided with a bulge 108 adapted to nearly close the orifice 104. To allow the clutch to quickly fully engage once working engagement is effected, the pin is again reduced as at 110, so that clutch slippage during regular operation will be avoided.

From the foregoing description, operation of the system should be readily understood. The selection of low and reverse gears, when the vehicle is not in motion is dependent upon opening the throttle a reasonable amount to avoid stalling. The selections of the other gears, dependent upon certain vehicle speeds being attained are independent of the throttle actuation. Thus, upon actuation of the clutch operating foot switch 48, and opening of the throttle and subsequent release of the clutch operating switch 48, automatic starting of the vehicle is effected, assuming switch 66 is in the normal automatic position illustrated. Subsequent shifts are effected at such time as the clutch is operated and the vehicle speed warrants a change. It is possible that through the automatic control, shifts from low gear to high gear may be effected, skipping intermediate gear. Further, if it is desired to manually preselect any forward gear ratio, either higher or lower, operation of the switch 66 to the selected position, followed later by actuation of the clutch operating foot switch 48, will effect such change. Gear shifting automatically from high to the lower ratios may be effected provided the proper vehicle speed prevails at the time the clutch operating switch 48 is actuated.

If desired, the switch 70 which controls the forward or reverse operation of the system, and the switch 66 which is optional may be combined into a single lever, having a plurality of positions similar to the common H shift of a selective sliding gear three speeds forward and reverse transmission, as is diagrammatically illustrated in Figure 2.

For this purpose the switch 70 may be operated by a switch rail 116 and the switch 66 by a parallel adjacent rail 118, the two being notched as at 120 and 122 to accommodate a common hand lever 124, preferably spring biased into operative position in notch 120 of rail 116. Movement of the rail 116 to the position indicated in dotted by the notch 120' acts to make the same circuit as switch 70 would if thrown to the forward or F position. This is accomplished by the switch wiper contact 126 making contact with the contact 128 to close a circuit between leads 75' and 79'. Similarly, to establish the same connection as switch 70 for effecting reverse, the rail 116 may be moved so that the notch 120 takes the position indicated at 120''. Thus, a circuit is established between the leads 77' and 75' through the contact 130 and the wiper contact 126.

If manual control for selecting first or low, or intermediate gear is desired, the lever 124' may be placed in the notch 122 and the rail 118 shifted to either position 122' and 122'' depending on whether low or first gear selection is desired, or intermediate is desired. To effect the proper connections for this purpose the rail 118 carries a wiper contact 138, to make contact with contacts 140, 142 and 144, which establish connections between the lead 65' and intermediate gear solenoid 42 through lead 92', or else through the speedometer control through lead 67', or to low gear solenoid 32 through lead 90'. Thus, the former required separate operations of levers 70 and 66 are combined in the single convenient lever 124.

While the circuit disclosed in Figure 1 is preferred, various changes may be effected without altering the fundamental features. In practice it may be preferable to have the contact 80 exercise a snap action in passing from one segment for example 82 to another adjacent segment 84, so that only one connection is established at a time. One manner of accomplishing this is illustrated in Fig. 3 wherein a relay 87 is arranged in the connections 82 and 84 such that the coil thereof is energized by current flow through connection 82 to open circuit 84. Thus the contact 80 might bridge the gap between segments 82 and 84 without danger of engaging two gear ratios, should the circuit be applied to a transmission where both gears are not selected by a common rail such as 20, for it will readily be understood that the invention may be equally well applied to other transmissions having a lesser or greater number of speeds and with different operating mechanisms from that diagrammatically illustrated. By the use of the locks as shown, except during clutch and gear shifting operations all circuits are dead.

Though only a single embodiment of the invention has been illustrated and described, it is to be understood that the invention may be embodied in various arrangements. Various changes may be made, some of which have been illustrated, without departing from the spirit of the invention as will be apparent to those skilled in the art and reference should therefor be had to the appended claims for a definition of the limits of the invention.

What is claimed is:

1. In an automotive vehicle gear shift, an engine speed control, a transmission having a plurality of speed ratios, a clutch adapted to transmit power to said transmission and having a gear shifting initiating control operable thereby, a vehicle speed responsive device, and means associated with said transmission, clutch and control therefor, speed control means and speed responsive device for selecting one gear ratio upon actuation of said speed control and said clutch, and another ratio in response to said clutch control and said speed responsive device independent of actuation of said speed control.

2. In an automotive vehicle gear shift, an engine speed control, a transmission having a plurality of speed ratios, a clutch adapted to transmit power to the transmission and having a gear shifting initiating control operable thereby, a vehicle speed responsive device, and means associated with said transmission, clutch and initiating control therefor, speed control means and speed responsive device including a relay operated by said speed responsive device for rendering said speed control and said initiating control effective for selecting one gear ratio, and for rendering said speed responsive device and said initiating control effective for selecting another gear ratio.

3. In an automotive vehicle gear shift, an engine speed control, a transmission having a plurality of gear ratios, a clutch, means for disengaging said clutch, a circuit established by disengagement of said clutch and by actuation of said engine speed control for selecting one of said gear ratios, a vehicle speed responsive device, adapted to interrupt said circuit and establish a circuit independent of said speed control but dependent upon said clutch disengagement for selecting a different gear ratio.

4. In an automotive vehicle gear shift, an engine speed control, a transmission having a plurality of selectible gear ratios and locking means therefor for holding any selected ratio, a clutch adapted to transmit power to said transmission, means for disengaging said clutch and releasing said locking means during such disengagement, means operated by the action of said clutch disengagement and said engine speed control for initiating selection of one or another of said gear ratios and means for eliminating the action of said engine speed control from said last named means in the initiating selection of another gear ratio.

5. In an automotive vehicle gear shift, an engine speed control having a switch actuated thereby, a transmission having a plurality of selectible gear ratios and locking means for holding any selected gear ratio, a clutch, means for disengaging said clutch and substantially simultaneously releasing said locking means, a switch actuated by disengagement of said clutch and means including a speed responsive device in circuit with said last-named switch adapted to establish a selecting circuit to one of said gear ratios during a range of speeds above zero, and establish another gear ratio through said engine speed control switch at zero speed.

6. In an automotive vehicle gear shift, a transmission having a plurality of selectible gear ratios, an engine speed control having associated therewith means for partially completing the selection of a starting gear ratio, a clutch adapted to transmit power to said transmission, and means actuated by said clutch in the disengagement thereof and including a vehicle speed responsive device for completing in combination with said speed control the selection of said starting gear ratio at substantially zero speed, and for selecting another gear ratio during a range of speeds above substantially zero speed independent of said speed control.

7. In an automotive vehicle gear shift, a transmission having a plurality of selectible gear ratios, an engine speed control having associated therewith means for partially completing the selection of a starting gear ratio, a clutch adapted to transmit power to said transmission, means actuated by asid clutch in the disengagement thereof and including a vehicle speed responsive device for completing in combination with said speed control the selection of said starting gear ratio at substantially zero speed, and for selecting another gear ratio during a range of speeds above substantially zero speed, and means including said clutch actuated means for at will selecting one of said starting or said another gear ratio independent of said speed responsive device.

8. In an automotive vehicle gear shift, a transmission having a plurality of selectible gear ratios and locking means for holding any selected gear ratio, an engine speed control having associated therewith means for partially completing the selection of a starting gear ratio, a clutch adapted to transmit power to said transmission, means for disengaging said clutch and substantially simultaneously unlocking said locking means, and means actuated by the disengagement of said clutch, and including a vehicle speed responsive device for completing in combination with said speed control the selection of said starting gear ratio at substantially zero speed, and for selecting another gear ratio during a range of speeds above substantially zero speed.

9. In an automotive vehicle gear shift, a transmission having a plurality of selectible gear ratos and locking means for holding any selected gear ratio, an engine speed control having associated therewith means for partially completing the selection of a starting gear ratio, a clutch adapted to transmit power to said transmission, means for disengaging said clutch and substantially simultaneously unlocking said locking means, means actuated by the disengagement of said clutch, and including a vehicle speed responsive device for completing in combination with said speed control the selection of said starting gear ratio at substantially zero speed, and for selecting another gear ratio during a range of speeds above substantially zero speed, and means including said clutch actuated means for at will selecting said one of said starting or said another gear ratio independent of said speed responsive device.

10. In an automotive vehicle gear shift, a transmission having a plurality of selectible gear ratios and locking means for holding any selected gear ratio, an engine speed control having associated therewith means for partially completing the selection of a starting gear ratio, a clutch adapted to transmit power to said transmission, means operable for disengaging said clutch and substantially simultaneously unlocking said locking means, means actuated by said clutch in the disengagement thereof and including a vehicle speed responsive device for completing in combination with said speed control the selection of said starting gear ratio at substantially zero speed and for selecting another gear ratio during a range of speeds above substantially zero speed and means adapted upon termination of operation of said operable means for reengaging said clutch and means for reestablishing said locking means for holding the selected gear ratio.

11. In an automotive vehicle gear shift, a selective type transmission having three forward gear ratios and a reverse ratio, motor means for selecting any one of said ratios, means for resiliently urging disengagement of all of said ratios, locking means for holding any selected ratio, a clutch adapted to transmit power to the transmission, means for disengaging the clutch and releasing said locking means for the selection of a gear ratio, an engine speed control, a manually operable forward and reverse selection means, means actuated by disengagement of said clutch and actuation of said speed control and dependent upon the operation of said manual selection means for actuation of the motor means for said reverse ratio or one of said forward gear ratios.

12. In an automotive vehicle gear shift, a selective type transmission having three forward gear ratios and a reverse ratio motor means for selecting any one of said ratios, means for resiliently urging disengagement of all of said ratios, locking means for holding any selected ratio, a clutch adapted to transmit power to the transmission, means for disengaging the clutch and releasing said locking means for the selection of a gear ratio, an engine speed control, a manually operable forward and reverse selection means, means actuated by disengagement of said clutch and actuation of said speed control and dependent upon the operation of said manual selection means for actuation of the motor means for said reverse ratio or one of said forward gear ratios, and means responsive to a predetermined range of forward speeds of the vehicle and to disengagement of said clutch for effecting selection of motor means for selecting another forward gear ratio, independent of said speed control.

13. In an automotive vehicle gear shift, a selective type transmission having three forward gear ratios and a reverse ratio motor means for selecting any one of said ratios, means for resiliently urging disengagement of all of said ratios, locking means for holding any selected ratio, a clutch adapted to transmit power to the transmission, means for disengaging the clutch and releasing said locking means for the selection of a gear ratio, an engine speed control, a manually operable forward and reverse selection means, means actuated by disengagement of said clutch and actuation of said speed control and dependent upon the operation of said manual selection means for actuation of the motor means for said reverse ratio or one of said forward gear ratios, and means responsive to two separate predetermined ranges of forward speeds of the vehicle, and disengagement of said clutch for operating said motor means for effecting selection of one of either of the other forward gear ratios independent of said speed control.

14. In an automotive vehicle gear shift, a selective type transmission having three forward gear ratios and a reverse ratio, motor means for selecting any one of said ratios, means for resiliently urging disengagement of all of said ratios, locking means for holding any selected ratio, a clutch adapted to transmit power to the transmission, means for disengaging the clutch and releasing said locking means for the selection of a gear ratio, an engine speed control, a manually operable forward and reverse selection means, means actuated by disengagement of said clutch and actuation of said speed control and dependent upon the operation of said manual selection means for actuation of the motor means for said reverse ratio or one of said forward gear ratios, means responsive to a predetermined range of forward speeds of the vehicle and to disengagement of said clutch for effecting selection of motor means for selecting another forward gear ratio, independent of said speed control, and means for at will operating said motor means for selecting at least one of said forward gear ratios independent of said speed control and independent of said vehicle speed responsive means upon disengagement of said clutch.

15. In an automotive vehicle gear shift, a selective type transmission having three forward gear ratios and a reverse ratio, motor means for selecting any one of said ratios, means for resiliently urging disengagement of all of said ratios, locking means for holding any selected ratio, a clutch adapted to transmit power to the transmission, means for disengaging the clutch and releasing said locking means for the selection of a gear ratio, an engine speed control, a manually operable forward and reverse selection means, means actuated by disengagement of said clutch and actuation of said speed control and dependent upon the operation of said manual selection means for actuation of the motor means for said reverse ratio or one of said forward gear ratios, means responsive to two separate predetermined ranges of forward speeds of the vehicle, and disengagement of said clutch for operating said motor means for effecting selection of one of either of the other forward gear ratios independent of said speed control, and means for at will operating said motor means for selecting at least one of said forward gear ratios independent of said speed control and independent of said vehicle speed responsive means upon disengagement of said clutch.

16. In an automotive vehicle gear shift, a selective type transmission having three forward gear ratios and a reverse ratio, motor means for selecting any one of said ratios, means for resiliently urging disengagement of all of said ratios, locking means for holding any selected ratio, a clutch adapted to transmit power to the transmission, means for disengaging the clutch and releasing said locking means for the selection of a gear ratio, an engine speed control, a manually operable forward and reverse selection means, means actuated by disengagement of said clutch and actuation of said speed control and dependent upon the operation of said manual selection means for actuation of the motor means for said reverse ratio or one of said forward gear ratios, means responsive to two separate predetermined ranges of forward speeds of the vehicle, and disengagement of said clutch for operating said motor means for effecting selection of one of either of the other forward gear ratios independent of said speed control, means for at will operating said motor means for selecting at least one of said forward gear ratios independent of said speed control and independent of said vehicle speed responsive means upon disengagement of said clutch, and means associated with said manually operable means for actuating therefrom said means for at will operating said motor means.

17. In an automotive vehicle gear shift, a transmission having a plurality of forward gear ratios including a starting gear ratio, an engine control means, a clutch for transmitting power to said transmission, means responsive to actuation of said engine control means and disengagement of said clutch for selecting said starting gear ratio and means responsive to disengagement of said clutch and to vehicle speed for rendering said engine control means ineffective to select a starting gear ratio and for selecting another gear ratio independent of said engine control means.

18. In an automotive vehicle gear shift, a clutch, a transmission having a plurality of forward gear ratios including a starting gear ratio, electrical means for effecting selection of said gear ratios dependent upon disengagement of said clutch, an engine control means, a vehicle speed responsive device, circuit means established by operation of said engine control means for actuating the electrical means for effecting selection of a starting gear ratio, including a circuit breaking means actuatable for rendering said engine control means ineffective, and a circuit established by said vehicle speed responsive device in response to a predetermined range of vehicle speed for actuating said circuit breaking means and for effecting operation of said electrical means for effecting selection of another gear ratio.

19. In an automotive vehicle gear shift, a control, a transmission having a plurality of gear ratios, a clutch, a circuit established by disengagement of said clutch and by actuation of said control for selecting one of said gear ratios, a vehicle speed responsive device, adapted to interrupt said circuit and establish a circuit independent of said control but dependent upon said clutch disengagement for selecting a different gear ratio.

20. In an automotive vehicle gear shift, an engine speed control, a transmission having a plurality of gear ratios, a clutch, a circuit established by disengagement of said clutch and by actuation of said control for selecting one of said gear ratios, a vehicle speed responsive device, adapted to interrupt said circuit and establish a circuit independent of said engine speed control but dependent upon said clutch disengagement for selecting a different gear ratio.

JAMES WALTER CAVES.